March 18, 1969  H. A. HALEY  3,432,886
TUBULAR FILM EXTRUSION APPARATUS
Filed May 2, 1967
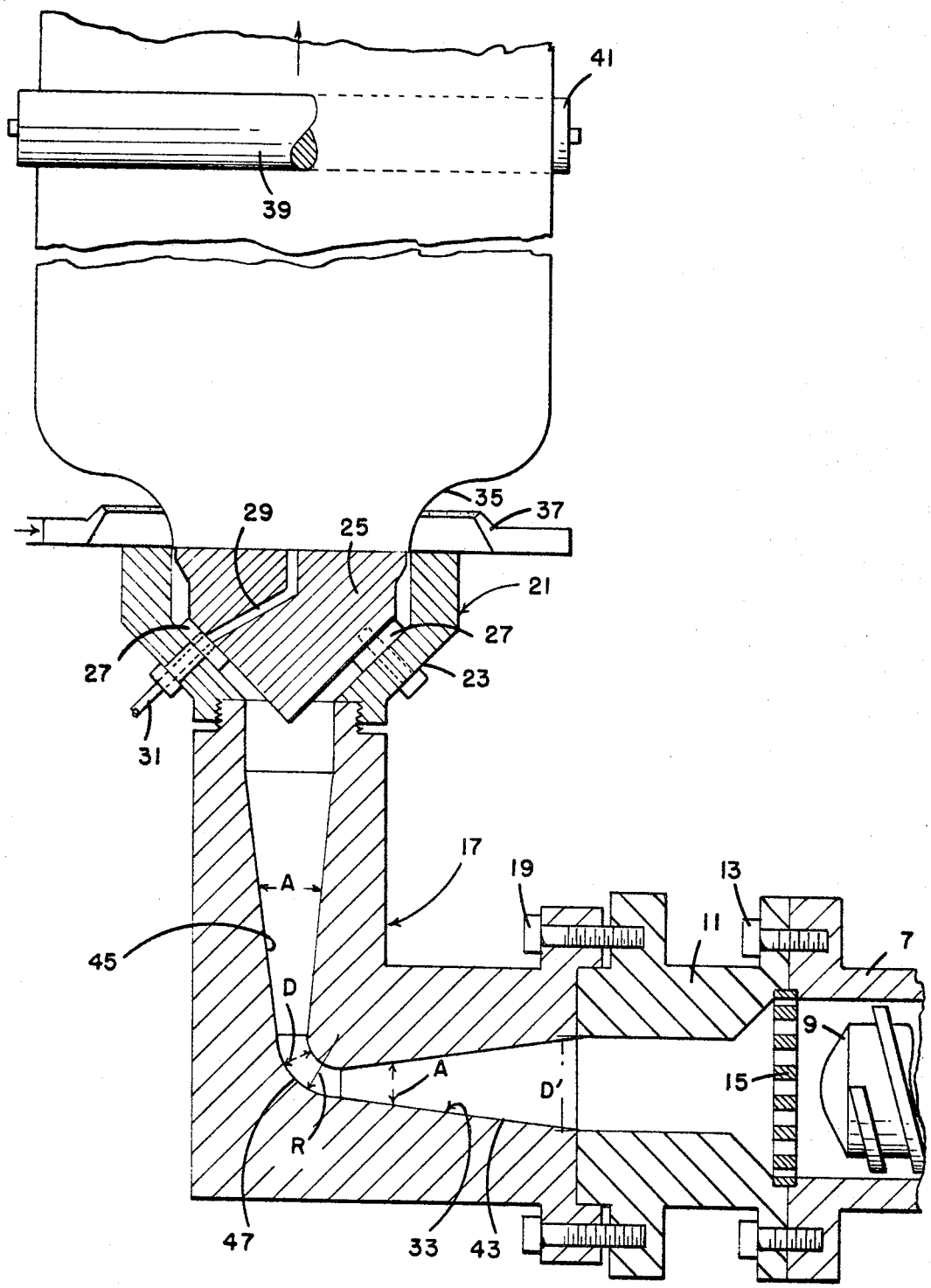

United States Patent Office 3,432,886
Patented Mar. 18, 1969

3,432,886
TUBULAR FILM EXTRUSION APPARATUS
Harold A. Haley, Secane, Pa., assignor to FMC Corporation, Philadelphia, Pa., a corporation of Delaware
Filed May 2, 1967, Ser. No. 635,605
U.S. Cl. 18—14         8 Claims
Int. Cl. B29d 23/04

ABSTRACT OF THE DISCLOSURE

Apparatus for making tubular film which includes an elbow having a passage for conveying molten thermoplastic material from an extruder to a die, the elbow passage having frusto-conical inlet and outlet sections which are connected at their smaller ends by a 90° angular section.

---

The present invention is directed to an extrusion apparatus and more particularly to improved apparatus for conveying molten thermoplastic material to a center-feed extrusion die.

In the use of center-feed extrusion dies in making tubular blown films, a stream of molten thermoplastic material is delivered under pressure along the generally horizontal path from a suitable extruder, passed through a 90° elbow whereby its flow is directed along a generally vertical path and is then fed into the center of the annular die from which it is extruded as a tubular film. With the use of this conventional equipment, it has been found that the physical properties of the finished tubular film, as for example the film wall thickness, vary along different portions of the film.

Generally, these variations in the finished tubular film have been attributed to differences in flow rates or pressures in the stream of molten thermoplastic material as it is extruded. The introduction of these flow differences into the stream of molten thermoplastic material is believed to occur as such material is conveyed through the 90° feed elbow where its travel is changed from a horizontal to a vertical direction.

In the United States Patent 2,952,871, a flow path compensator is described for use in equalizing all flow distances between an extruder and die. Such compensator, however, has not solved the above-described problem, and accordingly, it is a primary object of the present invention to provide a generally new or improved and more satisfactory feed apparatus for use with a center-feed annular extrusion die.

Another object is the provision of a feed apparatus for use with molten thermoplastic material which involves no apparent change in the physical properties of the material being conveyed.

Still another object is the provision of an apparatus for feeding molten thermoplastic material to a center-feed extrusion die, such apparatus being simple in construction, easy and economical to manufacture and adapted for use with extruders and extrusion dies of conventional construction.

These and other objects are accomplished in accordance with the present invention by employing an elbow having a passage, defined by frusto-conical inlet and outlet sections which are connected at their smaller ends by a 90° angular section, for conveying a molten thermoplastic material from a conventional extruder and into a center-feed annular die. The construction of the feed elbow of the present invention is predicated upon my discovery that the difficulties which are encountered with a conventional 90° elbow of uniform cross-section are the result of two inter-related conditions. As noted above, it is known that all portions of a stream of molten thermoplastic material do not travel paths of equal length during passage through a conventional feed elbow. Not heretofore recognized, however, is that the different portions of such stream of molten material are subjected to different thermal conditions which results in variations in flow rates and physical characteristics in the melt stream beyond the 90° elbow.

The flow passage of the feed elbow of the present invention is generally no greater in length than that of a conventional feed elbow and, as in the case of such conventional elbow, does include an angular section having a 90° bend. Of significance, however, is that the section of the flow passage of the elbow of the present invention is of much smaller diameter than the outermost ends of the passage frusto-conical sections between which it is located. Moreover, the radius of curvature of this angular section is much shorter than that employed in a conventional feed elbow.

Desirably, the diameter of the angular section of the flow passage of the elbow of the present invention is from 25% to 95%, and preferably from 30% to 75%, of the diameter of such passage at its outermost ends. The radius of curvature of this angular section of the elbow flow passage will depend upon its diameter and is desirably from 1 to 5 times, and preferably from 2 to 4 times, such diameter.

Compared with the inlet and outlet ends of the feed elbow passage, the smaller cross-section of the 90° angular section will, of course, accommodate a smaller volume of molten thermoplastic material. However, this smaller volume of molten material will flow at a more rapid speed. Thus, its total residence period within the 90° angular section of the feed elbow passsage, at which portions thereof are most likely to be subjected to different thermal conditions, is greatly reduced. Of course, the greater the reduction in the cross-section of the 90° angular section of the feed elbow passage, the smaller the volume and the more rapid the flow rate of the molten thermoplastic material passing therethrough. However, an excessive reduction in the cross-section of this angular section of the elbow passage will result in an undesirably excessive pressure drop and thus the diameter of this section should be within the range specified above.

The radius of curvature of the 90° angular section of the feed elbow passage determines the lengths of the paths of the various portions of the molten thermoplastic material as it travels therethrough. Obviously, the greater the radius of curvature of this section, the longer are the paths of the various portions of the molten material flowing therethrough and the greater are their residence periods within the angular section itself. Here again, a curvature of this angular section of the elbow flow passage which is greater than that described above will also result in an excessive pressure drop on the molten material and should therefore be avoided.

The frusto-conical sections of the flow passage of the elbow of the present invention are not necessarily of the same length or included angle. The smaller the included angle of these sections, the better are the flow properties which are exhibited by the molten thermoplastic material as it passes therethrough. However, to avoid excessively long frusto-conical sections, their included angles are desirably within the range of from 5° to 60°, and preferably from 7° to 30°.

The apparatus of the present invention is designed for use with a variety of molten thermoplastic materials which are capable of being shaped into tubular films, such as, vinyl polymers and copolymers, olefin polymers, polyesters, etc.

For a greater understanding of this invention, reference is made to the following detailed description and the single figure of the drawing which illustrates a vertical section taken longitudinally of an extrusion apparatus in which is incorporated the feed elbow of the present invention.

In the drawing, there is illustrated a portion of a conventional extruder having a barrel 7 and a feed screw 9. As within known extrusion equipment, an adaptor 11 is bolted at 13 to the barrel 7, with a breaker plate 15, and if necessary, suitable screens, positioned between the barrel and breaker plate.

A feed elbow 17, which is the subject matter of the present invention, is connected to the adaptor 11 by bolts 19. To the opposite end of the elbow 17 is fixed a conventional center-feed annular die 21 having an outer sleeve 23 and a mandrel 25. Spacers 27 are provided for supporting the mandrel 25 in desired position relative to the sleeve 23. A conduit 29 extends through the mandrel 25, one of the spacers 27 and the sleeve 23 and is connected by a pipe 31 to a source of air or other gas under pressure. Suitable heating means, not shown, are provided for heating and/or maintaining the molten thermoplastic material at a desired temperature as it travels through the extruder barrel 7, elbow 17, and die 21.

In the operation of the apparatus thus far described, molten thermoplastic material is fed by the extruder screw 9 through the openings in the breaker plate 15 and screen and into passage 33 of the elbow 17. This molten thermoplasic material passes through the elbow 17, is fed to the center of the die 21, and is extruded therefrom as a tubular film 35. As in conventional apparatus, a ring 37 is provided for impinging cool air or other gas onto the film as it issues from the die 21. Air or other gas under pressure is delivered by the pipe 31, through the conduit 29, and into the tubular film 35, so as to expand and orient the molecules thereof as it issues from the annular die 21. Nip rolls 39 and 41 are provided for collapsing the tubular film 33 upon itself at a location spaced from the die 21 to thus contain the film expanding gas.

Turning now to the feed elbow 17 of the present invention, the elbow passage 33 includes frusto-conical inlet and outlet sections 43 and 45, respectively, which are connected at their smaller ends by a 90° angular section 47. As heretofore mentioned, the frusto-conical sections 43 and 45 desirably have a minimum included angle so as to provide for good flow properties, and particularly to insure that no hold up of the molten material results. To avoid excessively long flow channels, the included angle of these frusto-conical sections 43 and 45, as indicated at A, are desirably from 5° to 60°, and preferably from 7° to 30°. The 90° angular section of the feed elbow passage is of uniform cross-section throughout its length and has a diameter D which is desirably from 25% to 95% and preferably from 30% to 75%, of the diameter D' of the outermost ends of the elbow passage sections 43 and 45. The radius of curvature R of the section 47 should also be minimized and is desirably from 1 to 5 times, and preferably from 2 to 4 times the diameter D of this section.

The feed elbow of the present invention, having dimensions within the ranges specified above, is adapted for use with a variety of different molten thermoplastic materials. Of course, the viscosities of the different molten materials will vary, as will the pressure drops experienced by these materials, as they flow through the feed elbow.

As heretofore mentioned, the feed elbow of the present invention may be employed with a conventional extruder and annular die for making tubular film without necessitating any modification in structure or operation of such extruder or die. For example, in making polyvinyl chloride tubular film, melt flow velocities of from 5.0 to 20.0 feet per minute are generally employed for satisfactory continuous operations. Using a conventional 90° feed elbow having a uniform ¾ inch passage, a melt flow velocity of 10.5 feet per minute will provide for a melt output of about 150 pounds per hour, while a melt flow velocity of 14.0 feet per minute will increase the melt output to about 200 pounds per hour.

With a feed elbow formed in accordance with the present invention, similar melt outputs can be achieved. The passage of such elbow, when used with a conventional extruder and annular die, would be of ¾ inch diameter at its outermost ends but would have a 90° angular section of reduced diameter. Reduction of the diameter of such angular section of the elbow flow passage to one-half (50% reduction) of the diameter at its entrance and exit ends would result in a 75% reduction in the cross-sectional area of the passage but would provide for an increase of about 4 times in the velocity of the melt flowing therethrough. Similarly, a 75% reduction in the diameter of such angular section would provide for about a 94% area reduction and a velocity increase of 16 times, while a 66⅔% diameter reduction would reduce the cross-sectional area of the angular section about 89% and would cause an increase of about 9 times in the melt-flow velocity.

It will be apparent that a melt-flow velocity increase of the characteristics described above greatly reduces the residence period of the melt within the angular section of the feed elbow at which all portions of such melt are not travelling paths of equal length. As a result, the time during which such various portions of the melt are subjected to different temperature conditions, which might alter its characteristics, is minimized.

It is to be understood that changes and variations may be made without departing from the spirit and scope of the invention as defined in the appended claims.

I claim:
1. In an apparatus for making tubular film from molten thermoplastic material which includes an extruder and an annular die, a feed elbow positioned between said extruder and die, said elbow having a flow passage including frusto-conical inlet and outlet sections and a 90° angular section extending between the smaller ends of said frusto-conical sections.

2. Apparatus as defined in claim 1 wherein the diameter of the angular section of the elbow flow passage is from 25% to 95% of the diameter of the passage at its inlet and outlet ends and is of uniform size through its length.

3. Apparatus as defined in claim 2 wherein the diameter of said angular section of the elbow flow passage is from 30% to 75% of the diameter of the passage at its outermost ends.

4. Apparatus as defined in claim 2 wherein the angular section of the elbow flow passage has a radius of curvature equal to from 1 to 5 times its diameter.

5. Apparatus as defined in claim 3 wherein the angular section of the elbow flow passage has a radius of curvature equal to from 2 to 4 times its diameter.

6. Apparatus as defined in claim 2 wherein the frusto-conical sections of the elbow flow passage each have included angles of from 5° to 60°.

7. Apparatus as defined in claim 6 wherein the angular section of the elbow flow passage has a radius of curvature of from 1 to 5 times its diameter.

8. Apparatus as defined in claim 5 wherein the frusto-conical sections of the elbow flow passage each have included angles of from 7° to 30°.

References Cited

UNITED STATES PATENTS 2,597,553    5/1952    Weber.
3,262,156    7/1966    Jung et al.

FOREIGN PATENTS 429,138    1/1967    Switzerland.

WILLIAM J. STEPHENSON, *Primary Examiner.*